(12) United States Patent
Jaffe et al.

(10) Patent No.: US 7,848,466 B2
(45) Date of Patent: *Dec. 7, 2010

(54) VITERBI SLICER FOR TURBO CODES

(75) Inventors: Steven T. Jaffe, Irvine, CA (US); Kelly B. Cameron, Irvine, CA (US); Christopher R. Jones, Los Angeles, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/358,362

(22) Filed: Jan. 23, 2009

(65) Prior Publication Data

US 2009/0122925 A1 May 14, 2009

Related U.S. Application Data

(63) Continuation of application No. 09/729,443, filed on Dec. 4, 2000, now Pat. No. 7,499,507.

(60) Provisional application No. 60/168,809, filed on Dec. 3, 1999.

(51) Int. Cl.
*H04L 27/06* (2006.01)
(52) U.S. Cl. ........................ 375/341; 375/354; 375/262; 714/785; 714/786; 714/794; 714/795
(58) Field of Classification Search ................ 375/341, 375/354, 262; 714/785, 786, 794, 795
See application file for complete search history.

(56) References Cited

U.S. PATENT DOCUMENTS 6,226,323 B1 * 5/2001 Tan et al. ..................... 375/233

(Continued)

OTHER PUBLICATIONS

Mottier, "Influence of tentative decisions provided by a Turbo-decoder on the carrier synchronization: Application to 64-QAM signals", COST 254 Workshop on Emerging Techniques for Communication Terminals, Toulouse France Jul. 7-9, 1997, pp. 326-330 see parent case.*

(Continued)

*Primary Examiner*—Juan A Torres
(74) *Attorney, Agent, or Firm*—Garlick Harrison & Markison; Shayne X. Short

(57) ABSTRACT

A method for synchronizing receivers that receive turbo encoded signals to a received signal. Turbo encoding may enable signals to be decoded at a much lower signal to noise ratio than previously practical. A traditional method of synchronizing a receiver to an incoming signal is to use a slicer to determine a received symbol and then to compare the determined symbol to the incoming waveform, in order to adjust the phase of the slicer with respect to the incoming signal. At signal low levels, at which turbo encoded signals may be decoded, this slicing method may be prone to errors that may disrupt the synchronization of the receiver to the incoming signal. By replacing the slicer by a Viterbi decoder with zero traceback (i.e., one which does not consider future values of the signal only past values) a prediction as to what the incoming signal is can be made. Because the Viterbi decoder can consider past signal values it can predict the present symbol being received with higher reliability than by using a slicer, which considers only the present value of the incoming signal.

20 Claims, 6 Drawing Sheets

U.S. PATENT DOCUMENTS

| | | | |
|---|---|---|---|
| 6,411,659 B1 * | 6/2002 | Liu et al. | 375/326 |
| 6,493,409 B1 * | 12/2002 | Lin et al. | 375/375 |
| 6,975,676 B1 * | 12/2005 | Goodson et al. | 375/231 |
| 2003/0007581 A1 * | 1/2003 | Agazzi et al. | 375/341 |

OTHER PUBLICATIONS

Langlais, "Synchronization in the carrier recovery of a satellite link using turbo-codes with the help of tentative decisions", IEE Colloquium on Turbo Codes in Digital Broadcasting—Could It Double Capacity? Nov. 22, 1999 pp. 5/1-5/7, see parent case.*

Mottier, "Influence of tentative decisions provided by a Turbo-decoder on the carrier synchronization: Application to 64-QAM signals", COST 254 Workshop on Emerging Techniques for Communication Terminals, Toulouse France Jul. 7-9, 1997, pp. 326-330.*

Langlais, "Synchronization in the carrier recovery of a satellite link using turbo-codes with the help of tentative decisions", IEE Colloquium on Turbo Codes in Digital Broadcasting—Could It Double Capacity?, Nov. 22, 1999 pp. 5/1-5/7.*

Sari, "Baseband Equalization and carrier recovery in Digital radio systems" IEEE Transactions on Communications, vol. COM-35 No. 3, pp. 319-327, 1987.*

Robertson, "Bandwidth-Efficient Turbo Trellis-coded Modulation Using Punctured Component Codes," IEEE Journal on Selected Areas in Communications; Feb. 1998,.pp. 206-218,. vol. 16, No. 2.*

* cited by examiner

FIG.2 —Prior Art—

VITERBI SLICER FOR TURBO CODES

CROSS REFERENCE TO RELATED PATENTS/PATENT APPLICATIONS

Continuation priority claim, 35 U.S.C. §120

The present U.S. Utility Patent Application claims priority pursuant to 35 U.S.C. §120, as a continuation, to the following U.S. Utility Patent Application which is hereby incorporated herein by reference in its entirety and made part of the present U.S. Utility Patent Application for all purposes:

1. U.S. Utility application Ser. No. 09/729,443, entitled "Viterbi slicer for turbo codes,", filed Dec. 4, 2000, pending, which claims priority pursuant to 35 U.S.C. §119(e) to the following U.S. Provisional Patent Application which is hereby incorporated herein by reference in its entirety and made part of the present U.S. Utility Patent Application for all purposes:

a. U.S. Provisional Application Ser. No. 60/168,809, entitled "Viterbi slicer for turbo codes,", filed Dec. 3, 1999, now expired.

BACKGROUND OF THE INVENTION

1. Technical Field of the Invention

The invention relates generally to communication systems; and, more particularly, it relates to signal acquisition and tracking within such communication systems.

2. Description of Related Art

As coding technology improves, signals can be decoded with lower signal to noise ratios. Decreasing signal levels that can be decoded require receivers that can acquire and track at lower signal levels. There is therefore a need in the art for receiver technology to enable the acquisition and tracking of signals at lower signal levels.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

It is understood that other embodiments of the present invention will become readily apparent to those skilled in the art from the following detailed description, wherein it is shown and described only embodiments of the invention by way of illustration of the best modes contemplated for carrying out the invention. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE SEVERAL VIEWS OF THE DRAWINGS

These and other features, aspects, and advantages of the present invention will become better understood with regard to the following description, appended claims, and accompanying drawings where:

DETAILED DESCRIPTION OF THE INVENTION

Figure 1:
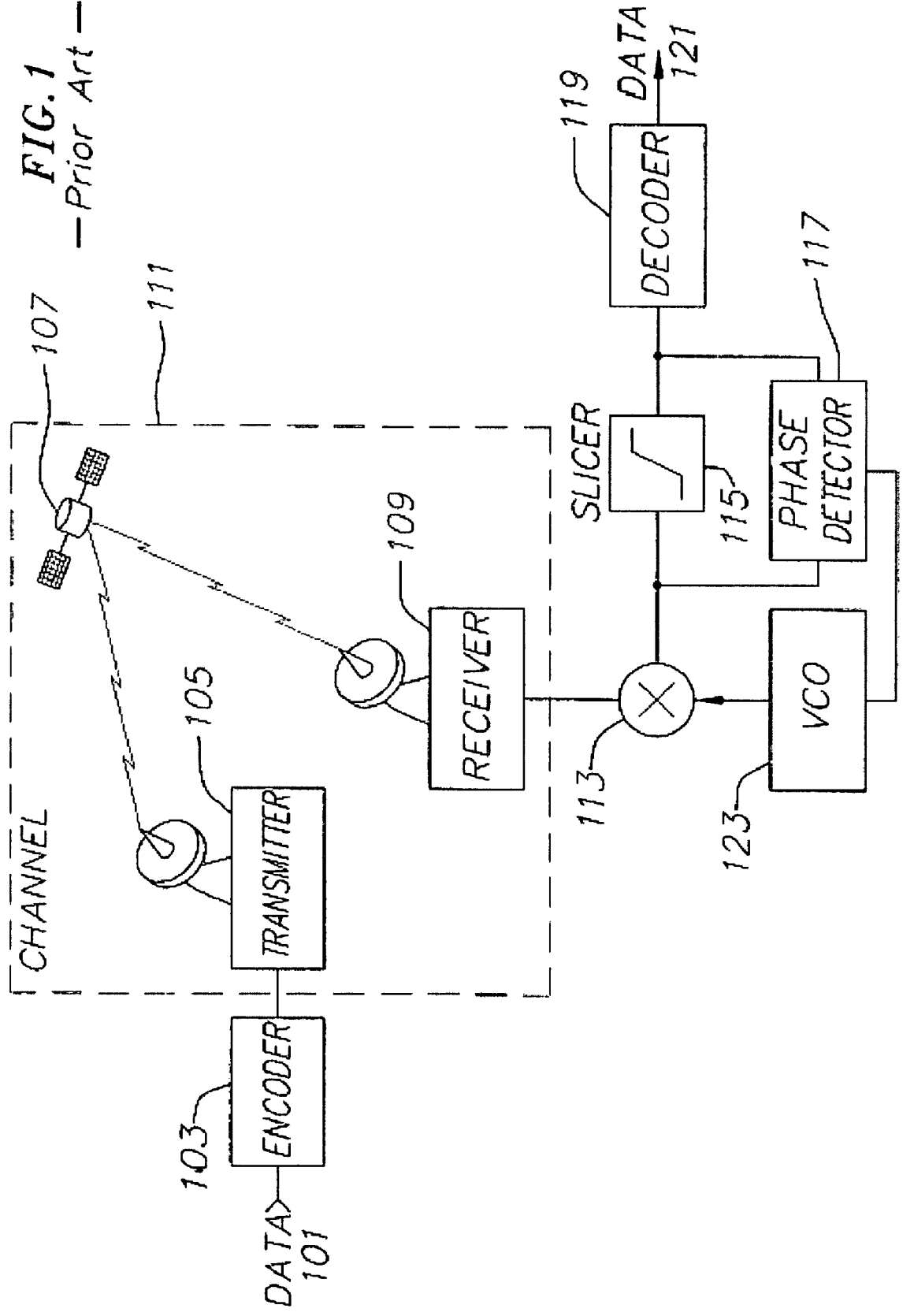
FIG. 1 is a graphical illustration of a prior art communications system.

FIG. 1 is a graphical illustration of a communications system. In FIG. 1, data 101 is provided to an encoder 103. The encoder codes the data and then provides it to a transmitter 105. The transmitter modulates the coded data on a carrier frequency, amplifies the resultant signal and broadcasts it to a relay satellite 107. The relay satellite 107 then rebroadcasts the data transmission to a receiver 109. The received signal is then provided by the receiver 109 to a mixer 113. A voltage controlled oscillator 123 provides a mixer signal to the mixer with the result that the coded signal is translated to a baseband signal. The coded baseband signal comprises the data and the coding added by encoder 103. The transport interface of the signal from (and including) the transmitter 105 to (and including) the receiver 109 is referred to as a channel 111.

The coded data from the multiplier 113 is filtered (filter not shown) and provided to a slicer 115. The slicer 115 extracts symbols from the coded data stream and provides it to a decoder 119. The decoder 119 decodes the symbols and creates a data stream 121. A phase detector 117 compares the symbol found by the slicer 115 with the value input to the slicer 115. By comparing the signal input to the slicer 115 to the actual symbol found by the slicer in the phase detector 117, the phase detector 117 detects whether the slicing process is leading or lagging the actual symbol value detected within the data stream. The phase detector 117 can then adjust the voltage controlled oscillator 123 to adjust the mixer signal provided to the multiplier 113 to match the carrier signal.

Figure 2:
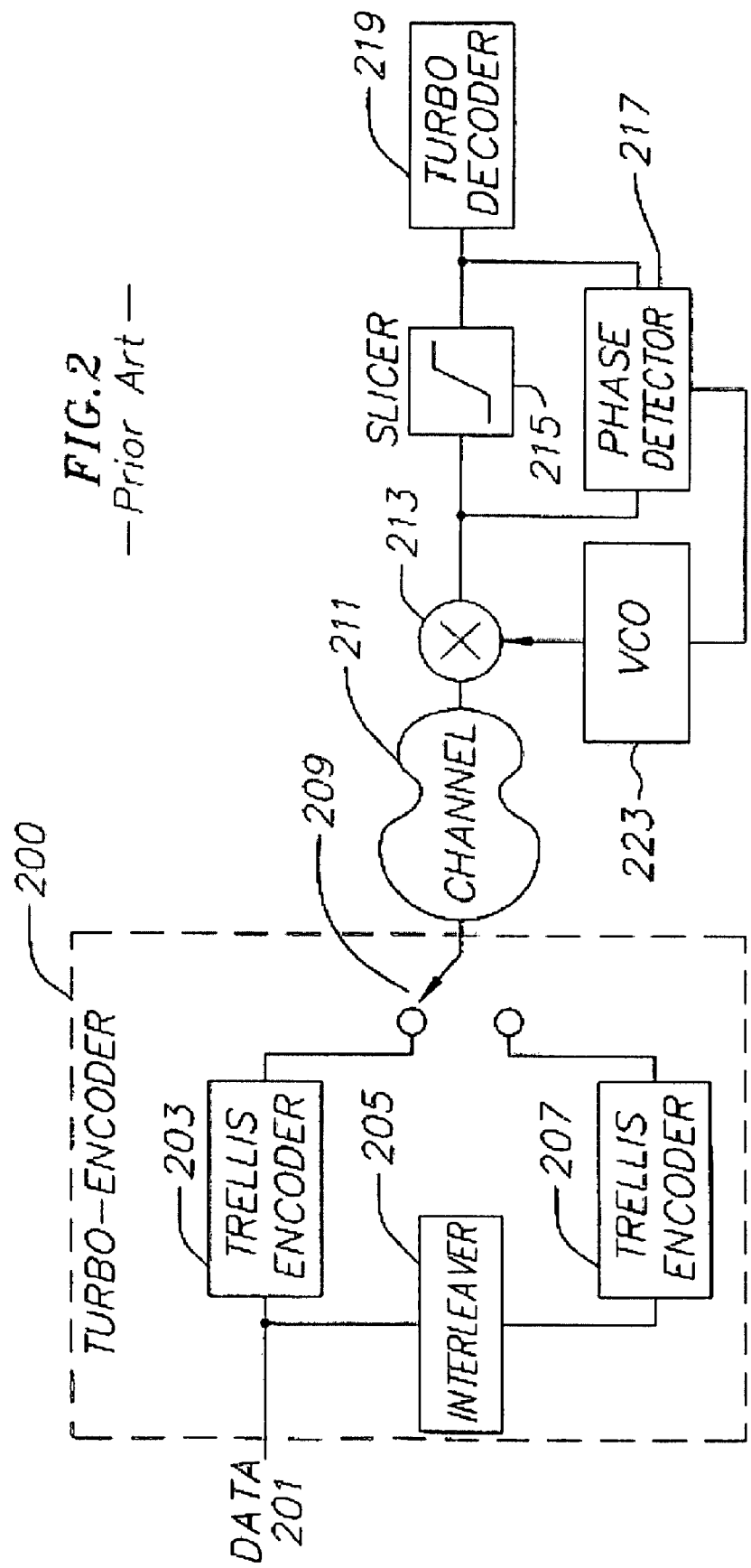
FIG. 2 is a graphical illustration of a communication system in which the coding section comprises a turbo encoder.

FIG. 2 is a graphical illustration of a communication system in which the encoder 103 replaced by a turbo encoder 200. The turbo encoder 200 accepts data 201. The data is then encoded in a first trellis encoder 203. The data is also interleaved by an interleaver 205 and provided to a second trellis encoder 207. The second trellis encoder 207 may be identical to the first trellis encoder 203, but it may also be different. The outputs of trellis encoders 203 and 207 are then punctured by switch 209. In other words, switch 209 selects between the output of trellis encoder 203 and trellis encoder 207. The punctured output of turbo encoder 200 is then provided to a channel 211.

The signal received from the channel is then coupled into a multiplier 213, and the received signal is mixed with a mixer signal (as provided by the voltage controlled oscillator (VCO) 223), which replicates the carrier signal. The slicer 215 slices the symbols from the data stream, and the phase detector 217 detects the difference between the sliced symbol found at the output of the slicer 215 and the value input to the slicer 215. The output of the phase detector 217 then adjusts the VCO 223 in order to correct the carrier signal being mixed in multiplier 213. The output of the slicer 215 is then coupled into turbo decoder 219 to decode the turbo encoded data.

Turbo encoder 200 is a parallel concatenated encoder. Parallel concatenated codes ("turbo codes") allow communications systems to operate near the Shannon capacity. However, when operating in this region, the signal to noise ratio may be very low. This low signal to noise ratio ($E_S/N_O$) can make synchronization with a received signal difficult. If the channel symbol error rate is greater than 1:10 (i.e., one out of ten transmitted signals is decoded incorrectly), a decision directed loop, such as illustrated in FIG. 2 (comprising the slicer 215 and phase detector 217) can fail. Such parallel concatenated codes ("turbo codes") can operate in this region.

Figure 3:
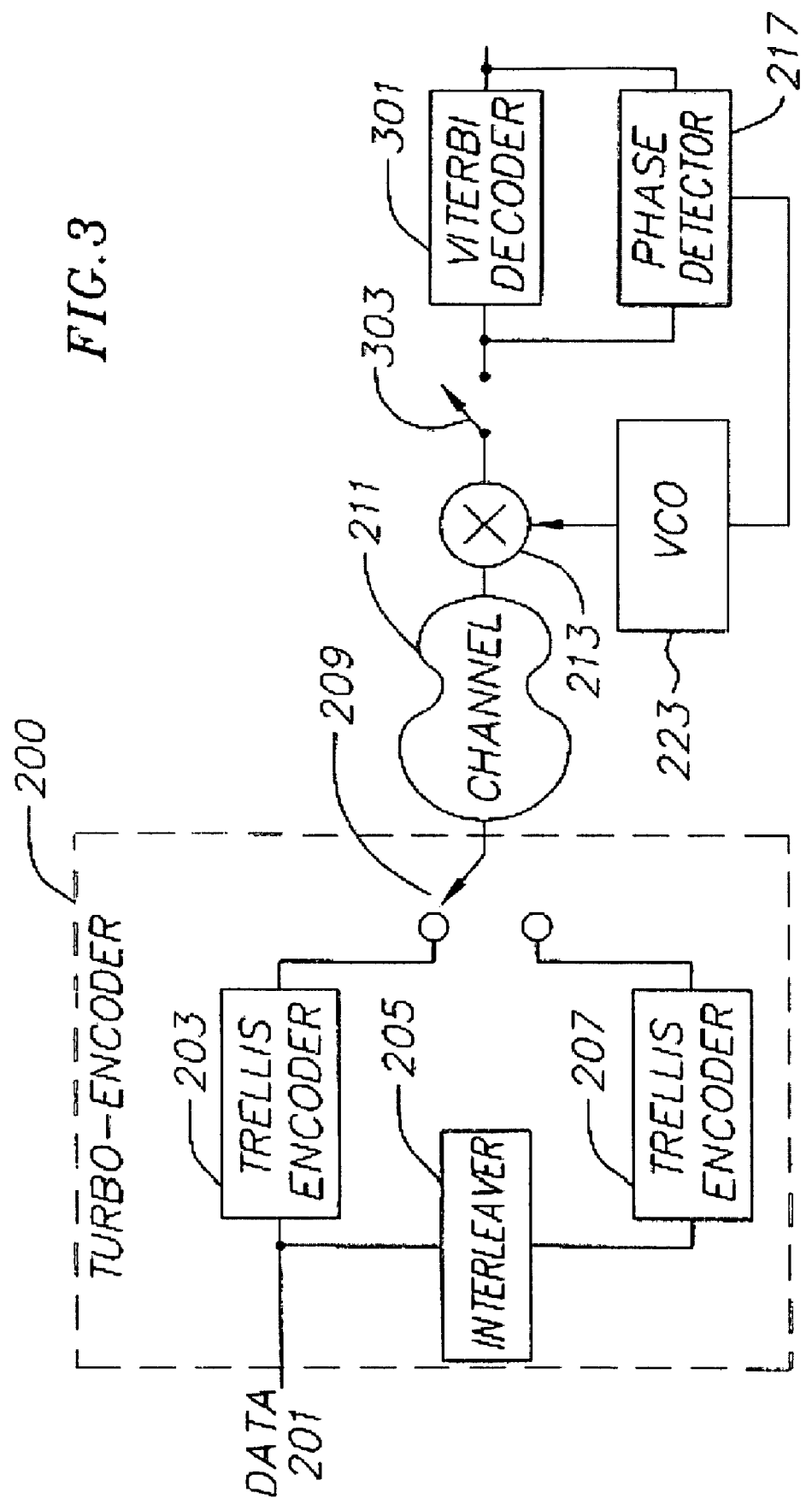
FIG. 3 is a graphic illustration of a communication system according to an embodiment of the invention.

In order to improve the accuracy, the slicer 215 may be replaced by a Viterbi decoder as illustrated in FIG. 3. Viterbi decoders typically produce the most likely channel symbol based on past data, present data and (depending on trace-back depth) future data. A Viterbi decoder uses the past and future data as well as correlations within the data to produce a current symbol that is more likely to be correct than if only the present data is used (such as with a typical data slicer). In the embodiment illustrated in FIG. 3, future data is not available, so the Viterbi decoder 301 will examine past and present data in order to produce a symbol, which is more likely to be accurate than one determined by a slicer mechanism such as illustrated in FIG. 2. A Viterbi decoder 301 is more likely to make an accurate decision as to what the symbol being decoded is based on a history of inputs than can a slicer, which makes a decision based on only the present input.

The turbo encoder 200, however, is a parallel concatenated encoder. Turbo encoder 200 comprises two trellis encoders separated by an interleaver 205. Any number of trellis encoders separated by interleavers may be used, but two are shown for sake of simplicity.

The interleaver 205 accepts the data 201 and interleaves or shuffles the data before providing it to the trellis encoder 207. As a result, the data provided by the lower leg of the turbo encoder comprising the trellis encoder 207 is out of sequence and must be resequenced. For this reason, switch 303 is added to the Viterbi decoder 301 so that only the symbols from trellis encoder 203 or trellis encoder 207 are used by the phase detector 217 to adjust the controlled oscillator 223. The delay introduced by interleaver 205 makes it impractical for the Viterbi decoder 301 to use symbols from both sides of the turbo encoder 200 without a buffering and delay mechanism at the input of the Viterbi decoder. Switch 303 will select every other symbol. Either a symbol from trellis encoder 203 will be selected or a symbol from trellis encoder 207 will be selected by switch 303.

Figure 4:
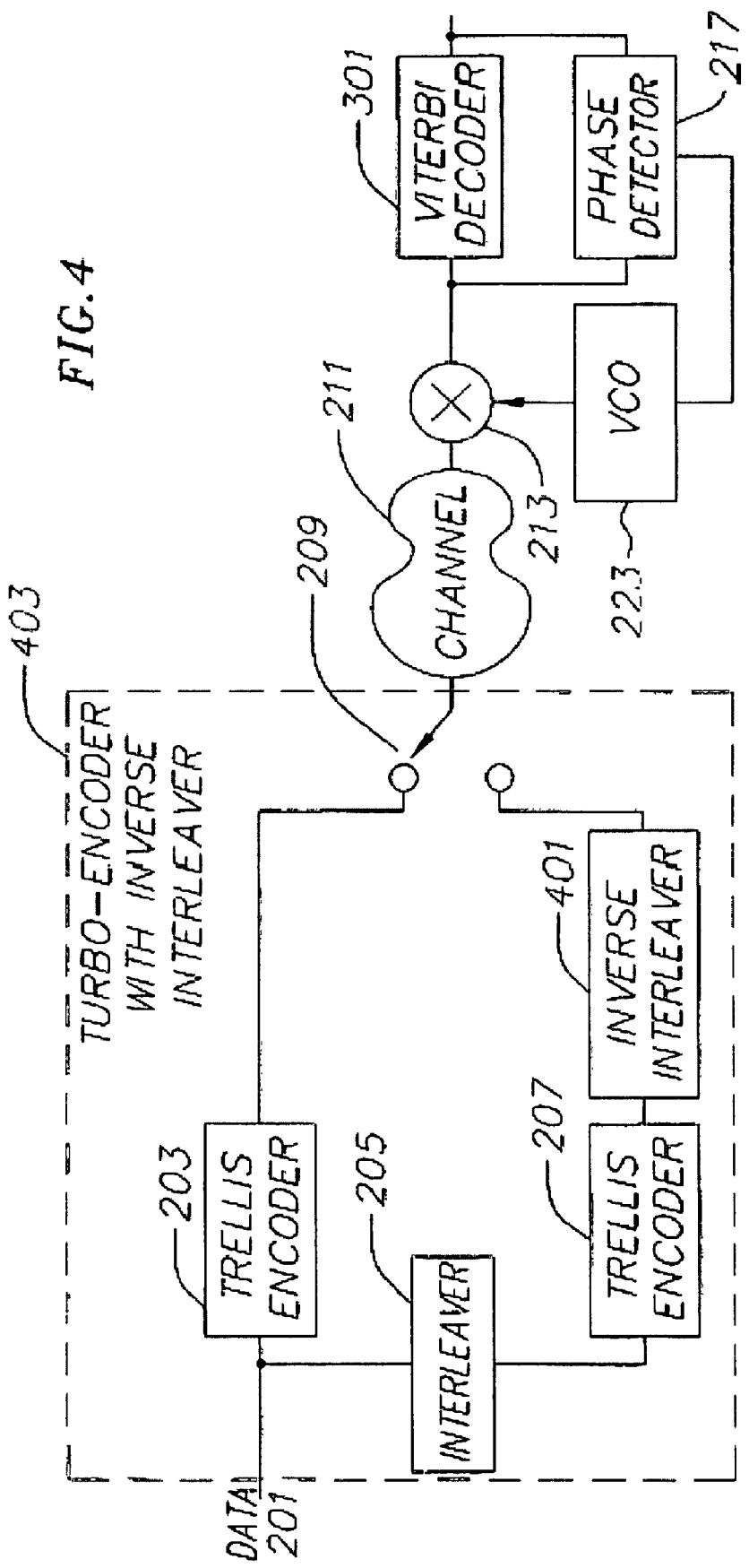
FIG. 4 is a graphic illustration of a communication system according to an embodiment of the invention.

FIG. 4 is a graphical illustration of a communication system according to an embodiment of the invention. In FIG. 4, the turbo encoder 403 has been modified by placing an inverse interleaver in series with trellis encoder 207. The inverse interleaver 401 unscrambles the order of the data which had been scrambled by the interleaver 205, after it has been trellis encoded. By utilizing inverse interleaver 401, every symbol can be used by the Viterbi decoder 301 in order to synchronize the frequency of the VCO 223.

Figure 5:
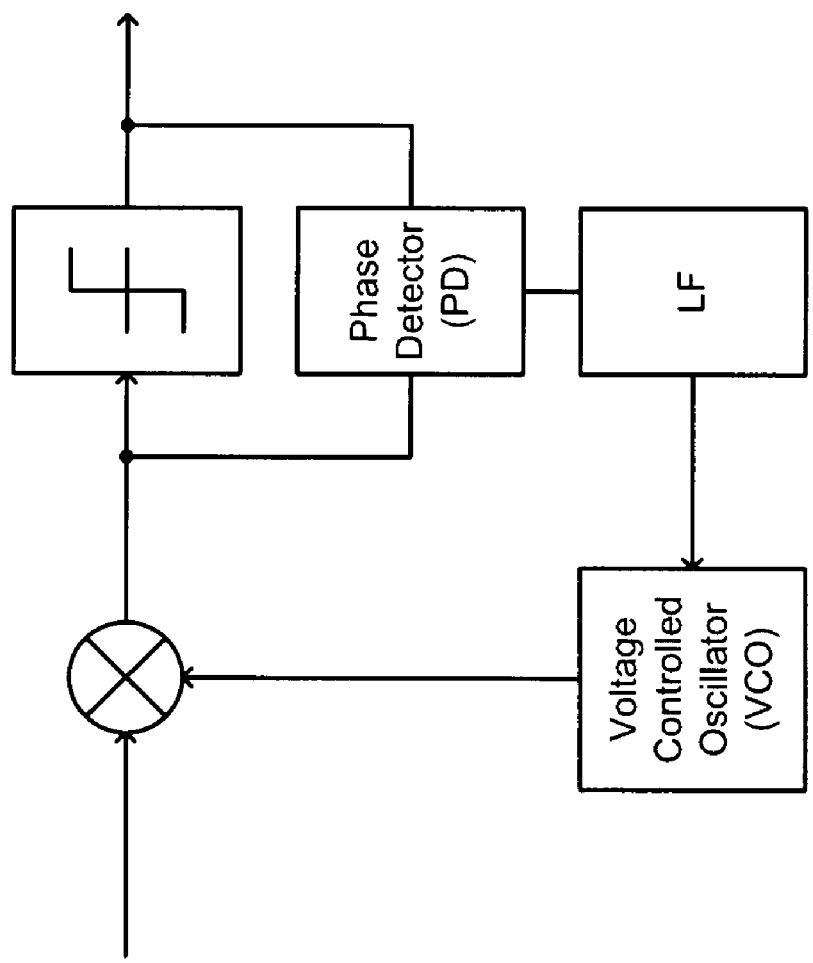
FIG. 5 is a graphic illustration of a conventional carrier loop.

FIG. 5 is a graphic illustration of a conventional carrier loop.

Figure 6:
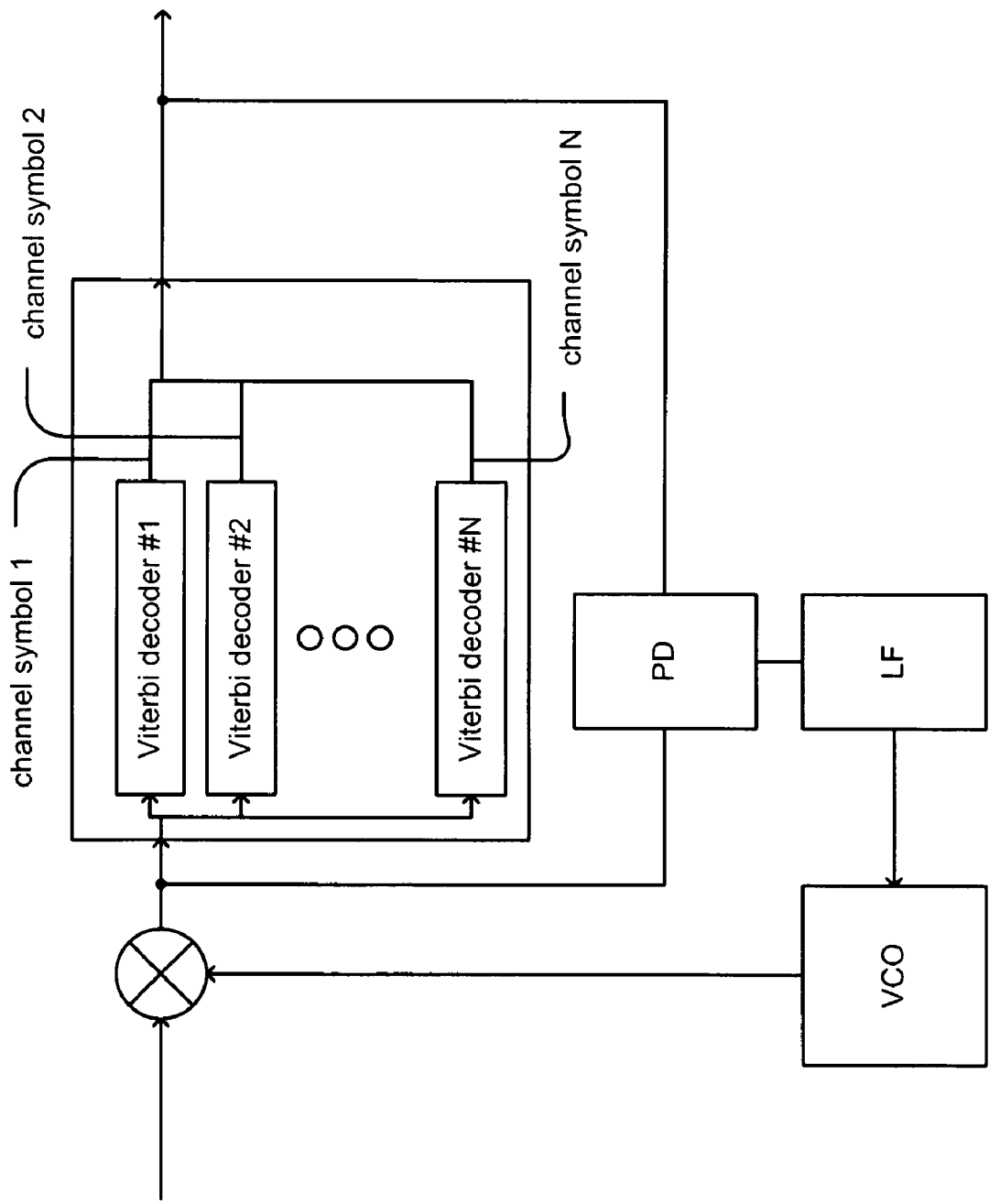
FIG. 6 is a graphic illustration of a carrier loop according to an embodiment of the invention.

FIG. 6 is a graphic illustration of a carrier loop according to an embodiment of the invention As mentioned above, when using "turbo codes," the constituent codes are often trellis codes. Each of the constituent codes can be decoded with a conventional Viterbi decoder. For example, in one embodiment, when using the iterative decoding procedure, the soft input/soft output decoding algorithm is used.

If instead of slicing the soft decisions at the decision point in the receiver, a sequence detector is used, decisions can be made with improved accuracy. A conventional decision directed carrier loop is shown in FIG. 5. One embodiment of the invention replaces the slicer with a Viterbi decoder. The improved receiver is shown in FIG. 6. In the case of "turbo codes", where two of more trellis codes are concatenated together, multiple Viterbi decoders are needed, all operating in parallel. In order to avoid the large delay inherent in Viterbi decoding, a limited traceback depth can be used. In fact, the traceback depth can be set to zero. The Viterbi decoder works on the incoming soft decisions and produces the most likely channel symbol based on past data and (depending on traceback depth) future data.

Although shown for a decision directed carrier loop, embodiments of the invention are also applicable to decision directed timing loops, and decision directed automatic gain control (AGC) loops. An extension of this invention can be used for decision feedback equalization (DFE). To extend to DFE, instead of one channel symbol being decoded, a vector of the most likely channel symbols is produced based on the internal Viterbi metrics. This vector of channel symbols is loaded in parallel into the DFE. This process is repeated for each new symbol.

Moreover, in one aspect of the present invention, a method of processing signals includes receiving first and second signals each being modulated on a carrier signal, the first signal preceding the second signal in time, multiplying each of the first and second signals with a reference signal having a reference frequency, adjusting the multiplied first signal based on the multiplied first and second signals, comparing the adjusted first signal to the multiplied first signal, and adjusting the reference frequency as a function of the comparison.

In another aspect of the present invention, a receiver includes an oscillator having a reference signal output with a tunable reference frequency, a multiplier to multiply a first signal with the reference signal, and to multiply a second signal, succeeding the first signal in time, with the reference signal, the first and second signals each being modulated on a carrier frequency, a decoder to adjust the multiplied first signal based on the multiplied first and second signals, and a detector to compare the adjusted first signal with the multiplied first signal, the detector being adapted to tune the reference frequency as a function of the comparison.

In yet another aspect of the present invention, a receiver includes an oscillator having a tuning input, a multiplier having a first input to receive a signal, and a second input coupled to the oscillator, the signal comprising a first signal and a second signal succeeding the first signal in time, the first and second signals each being modulated on a carrier frequency, a decoder having an input coupled to the multiplier, and an output, and a detector having a first input coupled to the decoder input, a second input coupled to the decoder output, and an output coupled to the tuning input of the oscillator.

In a further aspect of the present invention, a receiver includes oscillator means for generating a reference signal having a tunable reference frequency, multiplier means for multiplying a first signal with the reference signal, and multiplying a second signal, succeeding the first signal in time, with the reference signal, the first and second signals each being modulated on a carrier frequency, decoder means for adjusting the multiplied first signal based on the multiplied first and second signals, and detector means for comparing the adjusted first signal with the multiplied first signal, the detector means comprises tuning means for tuning the reference frequency as a function of the comparison.

In yet a further aspect of the present invention, a method of processing signals having a first and second symbol each representing a constellation point, the first symbol preceding the second symbol in time, includes quantizing the first symbol to its nearest constellation point as a function of the first and second signals, comparing the first symbol to the quantized first symbol, and adjusting a reference frequency as a function of the comparison.

In still a further aspect of the present invention, a receiver to receive a signal including first and second symbols each representing a constellation point, the first symbol preceding the second symbol in time, includes a decoder to quantize the first symbol as a function of the first and second symbols, a detector to compare the first symbol to the quantized first symbol, and an oscillator having a tunable output as a function of the comparison.

In another aspect of the present invention, a communications system includes a transmitter to transmit a signal including first and second symbols each representing a constellation point, the first symbol preceding the second symbol in time, and a receiver including a decoder to quantize the first symbol as a function of the first and second symbols, a detector to compare the first symbol to the quantized first symbol, and an oscillator having a tunable output as a function of the comparison.

Although a preferred embodiment of the present invention has been described, it should not be construed to limit the scope of the appended claims. Those skilled in the art will understand that various modifications may be made to the described embodiment. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

What is claimed is:

1. An apparatus, comprising:
a multiplier for mixing a turbo coded signal;
a buffer and delay module, coupled to the multiplier, for processing the mixed turbo coded signal thereby compensating for an interleaving delay incurred during generation of the turbo coded signal and thereby generating a compensated signal;
a Viterbi decoder for processing the compensated signal in accordance with sequence detection thereby generating a Viterbi decoded signal, wherein the Viterbi decoder processing symbols within the compensated signal corresponding to each respective trellis code of a turbo code employed to generate the turbo coded signal;
a phase detector, connected to an input and an output of the Viterbi decoder for receiving the compensated signal and outputting the Viterbi decoded signal, respectively, for determining a difference between the compensated signal and the Viterbi decoded signal; and
a voltage controlled oscillator, coupled to the phase detector and the multiplier, for governing a mixing frequency of the multiplier based on the difference between the compensated signal and the Viterbi decoded signal.

2. The apparatus of claim 1, further comprising:
a plurality of Viterbi decoders, coupled to the multiplier, for operating in parallel with one another such that each one of the plurality of Viterbi decoders processing the compensated signal thereby generating a respective channel symbol corresponding to a respective trellis code of the turbo code employed to generate the compensated signal; and wherein:
the Viterbi decoder being one of the plurality of Viterbi decoders;
the phase detector being coupled to the multiplier and connected to a respective input and a respective output of each of the plurality of Viterbi decoders; and
the phase detector determining a plurality of differences such that each one of the plurality of differences corresponding to a difference between the compensated signal that is input to a respective one of the plurality of Viterbi decoders and one respective channel symbol output from the respective one of the plurality of Viterbi decoders.

3. The apparatus of claim 2, further comprising:
a turbo decoder, coupled to the plurality of Viterbi decoders, for receiving each respective channel symbol output from each of the plurality of Viterbi decoders; and wherein:
the turbo decoder decoding each respective channel symbol for making respective estimates of information bits encoded therein.

4. The apparatus of claim 1, further comprising:
at least one additional decoder, coupled to the Viterbi decoder, for decoding the Viterbi decoded signal for making estimates of information bits encoded therein.

5. The apparatus of claim 1, wherein:
the Viterbi decoder operating with a zero traceback depth.

6. The apparatus of claim 1, wherein:
the turbo coded signal being received wirelessly by the apparatus.

7. The apparatus of claim 1, wherein:
the multiplier, whose mixing frequency being governed by the voltage controlled oscillator, multiplying the turbo coded signal by the mixing frequency for matching a carrier frequency of the turbo coded signal to assist in recovery of a first symbol, a second symbol, and a third symbol from the turbo coded signal.

8. The apparatus of claim 7, wherein:
the Viterbi decoder considering the first symbol when estimating the second symbol; and
the Viterbi decoder considering the first symbol and the second symbol when estimating the third symbol.

9. The apparatus of claim 1, wherein:
the apparatus being a communication device; and
the communication device being a receiver.

10. The apparatus of claim 1, wherein:
the apparatus being a communication device; and
the communication device being implemented within a satellite communication system.

11. An apparatus, comprising:
a multiplier that processes for mixing a turbo coded signal;
a buffer and delay module, coupled to the multiplier, for processing the mixed turbo coded signal thereby compensating for an interleaving delay incurred during generation of the turbo coded signal and thereby generating a compensated signal;
a plurality of Viterbi decoders, coupled to the buffer and delay module, for operating in parallel with one another such that each respective one of the plurality of Viterbi decoders processing the compensated signal in accordance with sequence detection for generating respective channel symbols corresponding to one respective trellis code of a turbo code employed to generate the turbo coded signal;
a phase detector, connected to a respective input and a respective output of each of the plurality of Viterbi decoders, for determining a difference between the compensated signal and at least one channel symbol generated by at least one of the plurality of Viterbi decoders; and a voltage controlled oscillator, coupled to the phase detector and the multiplier, for governing a mixing frequency of the multiplier based on the difference between the compensated signal and the at least one channel symbol.

12. The apparatus of claim 11, further comprising:

a turbo decoder, coupled to the plurality of Viterbi decoders, for receiving each respective channel symbol output from each of the plurality of Viterbi decoders; and wherein:

the turbo decoder decoding each respective channel symbol for making respective estimates of information bits encoded therein.

13. The apparatus of claim 11, wherein:

each of the plurality of Viterbi decoders operating with a zero traceback depth.

14. The apparatus of claim 11, wherein:

the multiplier, whose mixing frequency being governed by the voltage controlled oscillator, multiplying the turbo coded signal by the mixing frequency for matching a carrier frequency of the turbo coded signal to assist in recovery of a first symbol, a second symbol, and a third symbol from the turbo coded signal.

15. The apparatus of claim 14, wherein:

one of the plurality of Viterbi decoders considering the first symbol when estimating the second symbol; and the one of the plurality of Viterbi decoders considering the first symbol and the second symbol when estimating the third symbol.

16. The apparatus of claim 11, wherein:

the apparatus being a communication device; and
the communication device being a receiver.

17. An apparatus, comprising:

a multiplier for mixing a turbo coded signal;

a buffer and delay module, coupled to the multiplier, for processing the mixed turbo coded signal thereby compensating for an interleaving delay incurred during generation of the turbo coded signal and thereby generating a compensated signal;

a first Viterbi decoder, coupled to the multiplier, for processing the compensated signal in accordance with sequence detection for generating a first channel symbol corresponding to a first trellis code of a turbo code employed to generate the turbo coded signal;

a second Viterbi decoder, coupled to the multiplier and operating in parallel with the first Viterbi decoder, for processing the compensated signal in accordance with sequence detection for generating a second channel symbol corresponding to a second trellis code of the turbo code employed to generate the turbo coded signal;

a phase detector, connected to a first input and a first output of the first Viterbi decoder for receiving the compensated signal and outputting the first channel symbol, respectively, and connected to a second input and a second output of the second Viterbi decoder for receiving the compensated signal and outputting the second channel symbol, respectively, for:

determining a first difference between the compensated signal and the first channel symbol; and determining a second difference between the compensated signal and the second channel symbol; and a voltage controlled oscillator, coupled to the phase detector and the multiplier, for governing a mixing frequency of the multiplier based on at least one of the first difference and the second difference.

18. The apparatus of claim 17, further comprising:

a turbo decoder, coupled to the first Viterbi decoder and the second Viterbi decoder, for receiving the first channel symbol and the second channel symbol; and wherein:

the turbo decoder decoding the first channel symbol and the second channel symbol for making respective estimates of information bits encoded therein.

19. The apparatus of claim 17, wherein:

each of the first Viterbi decoder and the second Viterbi decoder operating with a zero traceback depth.

20. The apparatus of claim 17, wherein:

the apparatus being a communication device; and
the communication device being a receiver.

* * * * *